United States Patent
Noda

(10) Patent No.: US 9,796,246 B2
(45) Date of Patent: Oct. 24, 2017

(54) VEHICLE HEAT PUMP DEVICE, AND VEHICLE AIR-CONDITIONING DEVICE

(71) Applicant: Panasonic Intellectual Property Management Co., Ltd., Osaka (JP)

(72) Inventor: Yoshitoshi Noda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 14/649,806

(22) PCT Filed: Dec. 3, 2013

(86) PCT No.: PCT/JP2013/007100
§ 371 (c)(1),
(2) Date: Jun. 4, 2015

(87) PCT Pub. No.: WO2014/087645
PCT Pub. Date: Jun. 12, 2014

(65) Prior Publication Data
US 2015/0314669 A1   Nov. 5, 2015

(30) Foreign Application Priority Data

Dec. 6, 2012 (JP) .................................. 2012-267085
Dec. 19, 2012 (JP) .................................. 2012-276498

(51) Int. Cl.
*B60H 1/32* (2006.01)
*F25B 25/00* (2006.01)
(Continued)

(52) U.S. Cl.
CPC ....... *B60H 1/3205* (2013.01); *B60H 1/00921* (2013.01); *B60H 1/3204* (2013.01);
(Continued)

(58) Field of Classification Search
CPC .. F25B 25/005; F25B 41/04; F25B 2339/047; F25B 2400/0409; F25B 2400/0411;
(Continued)

(56) References Cited

U.S. PATENT DOCUMENTS 5,641,016 A    6/1997 Isaji et al.
6,237,351 B1 * 5/2001 Itoh .................... B60H 1/00921
                                              62/113
(Continued)

FOREIGN PATENT DOCUMENTS

EP    1 990 221 A1   11/2008
JP    59-071954 A    4/1984
(Continued)

OTHER PUBLICATIONS

International Search Report for Application No. PCT/JP2013/007100 dated Feb. 10, 2014.
(Continued)

*Primary Examiner* — Mohammad M Ali
(74) *Attorney, Agent, or Firm* — Pearne & Gordon LLP

(57) ABSTRACT

A heat pump device is provided with: a first refrigerant guide-in unit that guides in the high temperature, high pressure refrigerant discharged by the compressor from outside the housing; a water refrigerant heat exchanger that can dissipate heat from the high temperature, high pressure refrigerant guided in from the first refrigerant guide-in unit into a cooling fluid; and a housing accommodating the water refrigerant heat exchanger. The heat pump device is further provided with a cooling fluid guide-in unit that can guide the cooling fluid from outside the housing into the water refrigerant heat exchanger, a cooling fluid guide-out unit that can guide the cooling fluid out of the water refrigerant heat exchanger to the outside of the housing, and a first refrigerant guide-out unit that guides the refrigerant that has
(Continued)

passed through the water refrigerant heat exchanger to the outside of the housing.

9 Claims, 11 Drawing Sheets

(51) Int. Cl.
- F25B 41/04 (2006.01)
- B60H 1/00 (2006.01)
- F25B 5/04 (2006.01)
- F25B 6/04 (2006.01)

(52) U.S. Cl.
CPC ............ *F25B 25/005* (2013.01); *F25B 41/04* (2013.01); *B60H 2001/00928* (2013.01); *F25B 5/04* (2013.01); *F25B 6/04* (2013.01); *F25B 2339/047* (2013.01); *F25B 2341/0662* (2013.01); *F25B 2400/0409* (2013.01); *F25B 2400/0411* (2013.01); *F25B 2600/2501* (2013.01); *F25B 2600/2519* (2013.01)

(58) Field of Classification Search
CPC ...... F25B 2600/2501; F25B 2600/2519; F25B 5/04; F25B 6/04; F25B 2341/0662; B60H 1/3204; B60H 1/3205; B60H 1/00921; B60H 2001/00928
USPC ......................................................... 62/324.1
See application file for complete search history.

(56) References Cited

U.S. PATENT DOCUMENTS

| | | | |
|---|---|---|---|
| 6,244,060 B1 | 6/2001 | Takano | |
| 7,823,799 B2* | 11/2010 | Sakai | F24D 11/0214 237/19 |
| 2004/0231331 A1* | 11/2004 | Iwanami | F01C 13/00 60/670 |
| 2005/0061011 A1* | 3/2005 | Yakumaru | B60H 1/00878 62/238.6 |
| 2006/0005557 A1* | 1/2006 | Takano | B60H 1/00878 62/238.6 |
| 2007/0107462 A1* | 5/2007 | Ohta | B60H 1/00485 62/527 |
| 2007/0151270 A1* | 7/2007 | Matsunaga | B60H 1/00885 62/216 |
| 2007/0214817 A1* | 9/2007 | Inaba | B60H 1/00885 62/238.6 |
| 2008/0145731 A1* | 6/2008 | Sakajo | H01M 8/04014 429/414 |
| 2011/0023507 A1* | 2/2011 | Yana Motta | C09K 3/30 62/115 |
| 2011/0083466 A1* | 4/2011 | Lim | B60H 1/00335 62/498 |
| 2011/0167850 A1* | 7/2011 | Itoh | F25B 5/04 62/160 |
| 2012/0017637 A1* | 1/2012 | Nakajo | B60H 1/03 62/515 |
| 2012/0043390 A1* | 2/2012 | Noh | F24D 3/08 237/2 A |

FOREIGN PATENT DOCUMENTS

| | | |
|---|---|---|
| JP | 08-197937 A | 8/1996 |
| JP | 10-297270 A | 11/1998 |
| JP | 2001-041596 A | 2/2001 |
| JP | 2005-121242 A | 5/2005 |
| JP | 2006-327428 A | 12/2006 |
| JP | 2011-237052 A | 11/2011 |
| JP | 2012-006514 A | 1/2012 |
| JP | 2012-081870 A | 4/2012 |

OTHER PUBLICATIONS

Extended European Search Report issued in Patent Application No. EP 13 86 0263 dated Oct. 28, 2016.

* cited by examiner

VEHICLE HEAT PUMP DEVICE, AND VEHICLE AIR-CONDITIONING DEVICE

TECHNICAL FIELD

The present invention relates to a vehicle heat pump apparatus and a vehicle air-conditioning apparatus.

BACKGROUND ART

There is an automobile provided with both of an internal combustion engine and an electric motor, a so-called hybrid electric vehicle (HEV) or a plug-in hybrid vehicle (PHV). Typically, a vehicle air-conditioning apparatus mounted in such a vehicle provides heating to a vehicle interior using heat of the internal combustion engine and Joule heat generated by electrical power of a storage battery.

In addition, an air-conditioning apparatus configured to perform a cooling operation using a heat pump cycle is typically used. The heat pump cycle includes: a compressor disposed in an engine compartment; an outside heat exchanger disposed on a front side of a vehicle or at a position where air can be introduced to the outside heat exchanger; an evaporator disposed on an intake air path of the vehicle interior; and an expansion valve and/or the like. A high-temperature and high-pressure refrigerant compressed by the compressor is delivered to the outside heat exchanger and is cooled, and the cooled refrigerant is further brought into a low-temperature and low-pressure state by the expansion valve, and is delivered to the evaporator. The evaporator cools air supplied into the vehicle interior. The evaporator is provided in a heating, ventilation, and air conditioning system (hereinafter, referred to as an HVAC system) installed in the vehicle interior.

Heretofore, there have been several proposals for a vehicle air-conditioning apparatus that provides heating to the vehicle interior using a heat pump so as not to waste electrical power of the storage battery (see, e.g., Patent Literature (PTL) 1).

CITATION LIST

Patent Literature

PTL 1
Japanese Patent Application Laid-Open No. HEI 8-197937

SUMMARY OF INVENTION

Technical Problem

In the conventional vehicle air-conditioning apparatus which uses the heat pump cycle only during a cooling operation, a refrigerant pipe pattern is relatively simple as described above.

However, in the conventional vehicle air-conditioning apparatus which performs a heating operation using the heat pump cycle, the compressor and a cooling water-to-refrigerant heat exchanger are accommodated in the same housing (refer to FIGS. 21 to 24 in PTL 1). Hereinafter, a case will be discussed where the conventional vehicle air-conditioning apparatus configured to use the heat pump cycle only during the cooling operation is changed to perform the heating operation using the heat pump cycle as well. At this time, when the compressor and the cooling water-to-refrigerant heat exchanger are accommodated in the same housing, a refrigerant pipe pattern in the vicinity of the compressor is considerably changed, which is a problem.

In an automobile, various configuration elements such as an engine, a motor, a transmission, an air-conditioning compressor, and an intake air path are mounted in a small space. Accordingly, the layout flexibility of the configuration elements is low.

In the automotive field, a technical improvement is attempted via a so-called minor change in which a configuration is not considerably changed but is partially changed. The vehicle air-conditioning apparatus may be improved as a minor change of a vehicle, and in this case, the configuration of the vehicle air-conditioning apparatus is required to be modified so that other components of the vehicle are not affected.

Refrigerant pipes of the vehicle air-conditioning apparatus using the heat pump cycle are installed so as to avoid interference with other configuration elements of the vehicle. For this reason, a small change in the refrigerant pipe pattern is a pre-requisite for modifying the vehicle air-conditioning apparatus without affecting other configuration elements of the vehicle. Unlike cooling water pipes, the refrigerant pipes are made of aluminum, for example, so as to bear a high pressure. For this reason, a change in the layout of the refrigerant pipes is not an easy task. The refrigerant pipes are preferably not considerably changed so as not to considerably affect the layout of other configuration elements of the vehicle.

An object of the present invention is to provide a vehicle heat pump apparatus and a vehicle air-conditioning apparatus which involve only few changes in a refrigerant pipe pattern compared to a conventional vehicle air-conditioning apparatus using a heat pump cycle only during a cooling operation, and which can perform a heating operation using a heat pump cycle.

Solution to Problem

A vehicle heat pump apparatus according to an aspect of the present invention is a vehicle heat pump apparatus that introduces and uses a high-temperature and high-pressure refrigerant discharged from a compressor configured to compress a suctioned refrigerant disposed outside a housing, the apparatus including: a first refrigerant introduction section through which the high-temperature and high-pressure refrigerant discharged from the compressor is introduced from outside the housing; a cooling water-to-refrigerant heat exchanger capable of releasing heat from the high-temperature and high-pressure refrigerant introduced from the first refrigerant introduction section to a cooling water; the housing that accommodates the cooling water-to-refrigerant heat exchanger; a cooling water introduction section that allows the cooling water to be introduced into the cooling water-to-refrigerant heat exchanger from outside the housing; a cooling water outlet section that allows the cooling water to flow through outside the housing from the cooling water-to-refrigerant heat exchanger; and a first refrigerant outlet section that allows the refrigerant passing through the cooling water-to-refrigerant heat exchanger to flows through outside the housing.

Advantageous Effects of Invention

According to the present invention, it is possible to easily perform not only a cooling operation but also a heating operation using a heat pump cycle by connecting a vehicle heat pump apparatus to an outside heat exchanger, a compressor, and an evaporator via pipes. In addition, it is possible to reduce changes in a refrigerant pipe pattern compared to a conventional vehicle air-conditioning apparatus using the heat pump cycle during a cooling operation.

DESCRIPTION OF EMBODIMENTS

Hereinafter, embodiments of the present invention will be described in detail with reference to the accompanying drawings.

Embodiment 1

Figure 1:
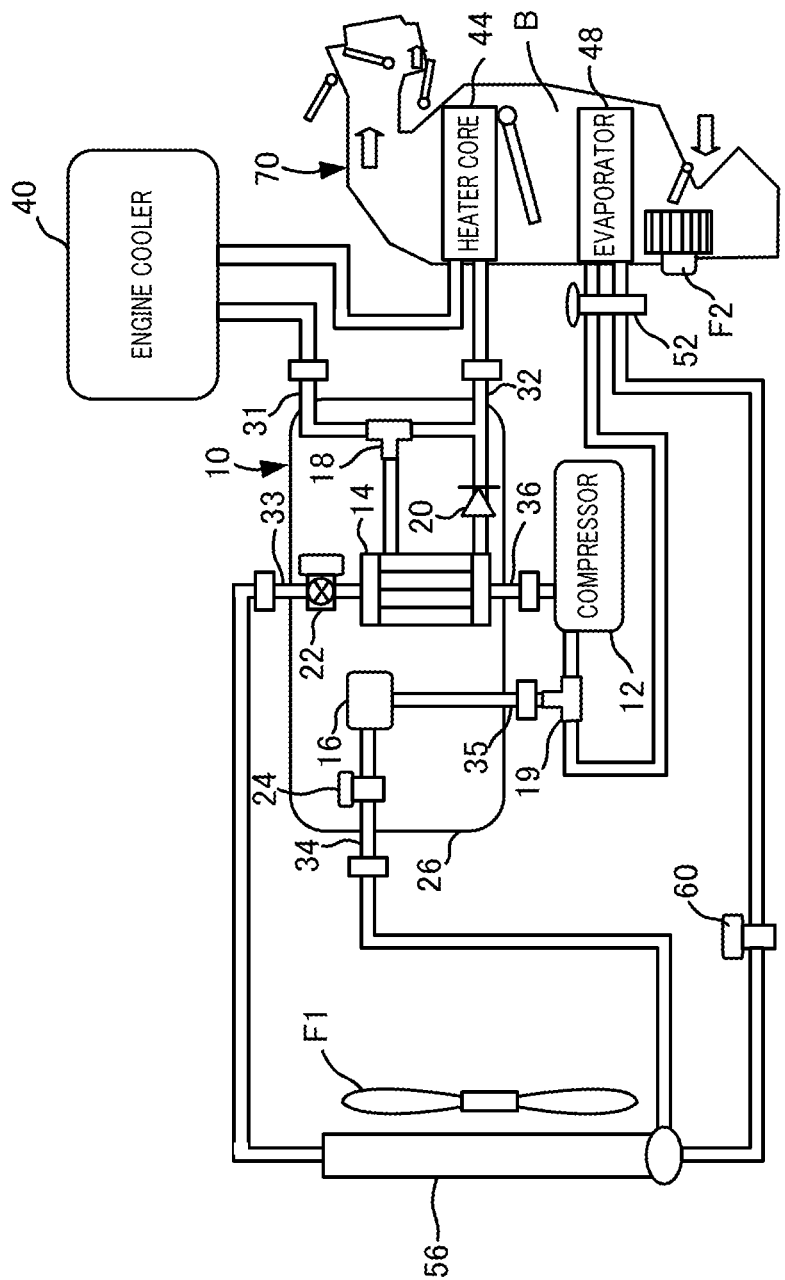
FIG. 1 is a configuration diagram illustrating a vehicle heat pump apparatus and a vehicle air-conditioning apparatus of Embodiment 1 of the present invention.

FIG. 1 is a configuration diagram illustrating a vehicle heat pump apparatus and a vehicle air-conditioning apparatus of Embodiment 1 of the present invention.

The vehicle air-conditioning apparatus of Embodiment 1 of the present invention includes vehicle heat pump apparatus 10; engine cooler (equivalent to an internal combustion engine cooler) 40; heater core 44; evaporator 48; compressor 12; expansion valve 52; outside heat exchanger 56; opening and closing valve 60; cooling water pipes, refrigerant pipes, and connection portions which connect the components; and the like. Heater core (equivalent to a heating heat exchanger) 44 and evaporator 48 are included in HVAC system 70 mounted in a vehicle interior. Here, the vehicle interior refers to a space positioned inside a fire wall.

Vehicle heat pump apparatus 10 includes cooling water-to-refrigerant heat exchanger 14; accumulator 16; three-way valve 18; check valve 20; orifice opening and closing valve 22; opening and closing valve 24; housing 26; cooling water introduction pipe 31; cooling water outlet pipe 32; two refrigerant outlet pipes 33 and 35; two refrigerant introduction pipes 34 and 36; and a control section.

Compressor 12 compresses the suctioned refrigerant to a high-temperature and high-pressure state, and discharges the compressed refrigerant. Compressor 12 includes a compressor mechanism therein, in which the compressor mechanism compresses the suctioned refrigerant, and discharges the compressed refrigerant. For example, the compressor mechanism is driven by an electric motor. A suction inlet for the refrigerant in compressor 12 communicates with an outlet of a refrigerant path of evaporator 48 via pipes and connection portion 19. In addition, the suction inlet for the refrigerant in compressor 12 communicates with refrigerant outlet pipe 35 via pipes and connection portion 19. Connection portion 19 works to simply communicate the outlet of the refrigerant path of evaporator 48, refrigerant outlet pipe 35, and the suction inlet for the refrigerant in compressor 12 with each other. A refrigerant discharge outlet of compressor 12 communicates with an inlet of a refrigerant path of cooling water-to-refrigerant heat exchanger 14 via refrigerant introduction pipe 36.

Cooling water-to-refrigerant heat exchanger 14 has a cooling water path and the refrigerant path, and the cooling water path and the refrigerant path are configured to be in large area contact with each other so that a large amount of heat exchange can be performed therebetween. An inlet of the refrigerant path communicates with the discharge outlet of compressor 12, and an outlet of the refrigerant path communicates with refrigerant outlet pipe 33 provided with orifice opening and closing valve 22. An inlet of the cooling water path is connected to three-way valve 18 via a pipe, and an outlet for the cooling water is connected to check valve 20 via a pipe.

The high-temperature and high-pressure refrigerant flows through cooling water-to-refrigerant heat exchanger 14 while compressor 12 is driven, and in contrast, the cooling water is made to flow or not to flow through cooling water-to-refrigerant heat exchanger 14 by the switching of three-way valve 18. When the cooling water flows through cooling water-to-refrigerant heat exchanger 14, heat is released from the high-temperature and high-pressure refrigerant to the cooling water, and when the cooling water does not flow, the high-temperature and high-pressure refrigerant passes through cooling water-to-refrigerant heat exchanger 14 while maintaining substantially the same high temperature.

Three-way valve 18 is switched by electric control to allow the cooling water to flow from cooling water introduction pipe 31 to either one of cooling water-to-refrigerant heat exchanger 14 and cooling water outlet pipe 32.

Check valve 20 prevents a reverse flow of the cooling water to cooling water-to-refrigerant heat exchanger 14.

In the embodiment, three-way valve 18 and check valve 20 are equivalent to cooling-water switching valves that switch the flow path of the cooling water between a flow path formed to bypass cooling water-to-refrigerant heat exchanger 14 and a flow path connected to cooling water-to-refrigerant heat exchanger 14.

Orifice opening and closing valve 22 is equivalent to an opening and closing valve having the function of an expansion valve. Orifice opening and closing valve 22 is an opening and closing valve configured to work as an expansion valve during a heating operation, and is electrically controlled by the control section to switch between an open state and a closed state. For example, orifice opening and closing valve 22 has a large-diameter path and an orifice made up of a small-diameter path, and the large-diameter path is configured to be openable and closeable. When the large-diameter path is opened, orifice opening and closing valve 22 allows the refrigerant to pass therethrough, and when the large-diameter path is closed and only the path of the orifice is open, a high-pressure refrigerant expands via the small-diameter path. The expanded refrigerant becomes a low-temperature and low-pressure refrigerant.

In a variation, it is possible to realize the same function as that of orifice opening and closing valve 22 by providing an opening and closing valve and a path configured to bypass the opening and closing valve in replacement of orifice opening and closing valve 22, and providing an orifice on the bypass path. In another variation, an electronic expansion valve may be provided, and may work as an expansion valve which is fully opened to allow the refrigerant to pass therethrough, and adjusts the opening thereof. Each of the variations is equivalent to an opening and closing valve having the function of an expansion valve.

Refrigerant introduction pipe 34 communicates with an input port of accumulator 16 via opening and closing valve 24. An output port of accumulator 16 communicates with refrigerant outlet pipe 35. Opening and closing valve 24 is electrically controlled by the control section to open and close a path between refrigerant introduction pipe 34 and the input port of accumulator 16.

Accumulator 16 separates a gaseous refrigerant from a liquefied refrigerant, and delivers only the gaseous refrigerant to compressor 12 via refrigerant outlet pipe 35.

Each of three-way valve 18, orifice opening and closing valve 22, and opening and closing valve 24 switches between an open state and a closed state in response to an electric signal transmitted from a control section of the vehicle air-conditioning apparatus. Alternatively, each of three-way valve 18, orifice opening and closing valve 22, and opening and closing valve 24 may be configured to switch between an open state and a closed state in response to a signal that is output by the control section of vehicle heat pump apparatus 10 based on a command from the control section of the vehicle air-conditioning apparatus.

Housing 26 accommodates cooling water-to-refrigerant heat exchanger 14, accumulator 16, three-way valve 18, check valve 20, orifice opening and closing valve 22, and opening and closing valve 24, and integrates the components into a single package. The surrounding of housing 26 may be insulated.

Refrigerant outlet pipe 33 and refrigerant outlet pipe 35 are respectively equivalent to a first refrigerant outlet section and a second refrigerant outlet section of vehicle heat pump apparatus 10. Refrigerant introduction pipe 36 and refrigerant introduction pipe 34 are respectively equivalent to a first refrigerant introduction section and a second refrigerant introduction section of vehicle heat pump apparatus 10. An end of each of refrigerant outlet pipes 33 and 35 and refrigerant introduction pipes 34 and 36 is exposed to the outside of housing 26, and is connected to the refrigerant pipes of the vehicle air-conditioning apparatus. A connector or a socket for pipe connection may be provided at the end of each of refrigerant outlet pipes 33 and 35 and refrigerant introduction pipes 34 and 36.

Engine cooler 40 and heater core 44 are connected in series to each other between cooling water outlet pipe 32 and cooling water introduction pipe 31. Outside heat exchanger 56 and evaporator 48 are connected sequentially in series to each other between refrigerant outlet pipe 33 and the suction inlet of compressor 12.

A refrigerant path disposed to connect evaporator 48 and the suction inlet of compressor 12 is also connected to refrigerant outlet pipe 35. A refrigerant path between outside heat exchanger 56 and evaporator 48 branches, and the branch path is connected to refrigerant introduction pipe 34. Hereinafter, a detailed description will be given.

Cooling water introduction pipe 31 and cooling water outlet pipe 32 are respectively equivalent to a cooling water introduction section and a cooling water outlet section of vehicle heat pump apparatus 10. An end of each of cooling water introduction pipe 31 and cooling water outlet pipe 32 is exposed to the outside of housing 26, and is connected to the cooling water pipes of the vehicle air-conditioning apparatus. The end of each of cooling water introduction pipe 31 and cooling water outlet pipe 32 may be provided with a connector or a socket for pipe connection.

Engine cooler 40 includes a water jacket that allows the cooling water to flow around the internal combustion engine, and a pump that makes the cooling water flow through the water jacket. Heat is released from the internal combustion engine to the cooling water flowing through the water jacket. An inlet and an outlet of a cooling water path of the water jacket communicate respectively to heater core 44 and cooling water introduction pipe 31 of vehicle heat pump apparatus 10.

Heater core 44 is a device in which the cooling water exchanges heat with air, and is disposed in intake air path B of HVAC system 70, through which air is supplied to the vehicle interior. A cooling water path of heater core 44 communicates with engine cooler 40 and cooling water outlet pipe 32 of vehicle heat pump apparatus 10. Fan F2 introduces outside air or the like to intake air path B of HVAC system 70.

Evaporator 48 is a section in which the refrigerant expanded to a low-temperature and low-pressure state exchanges heat with air, and is disposed in intake air path B of HVAC system 70. When the refrigerant expanded to a low-temperature and low-pressure state passes through evaporator 48, the low-temperature and low-pressure refrigerant evaporates by absorbing heat from air. An inlet of a refrigerant path of evaporator 48 communicates with outside heat exchanger 56 via a pipe while expansion valve 52 and opening and closing valve 60 are interposed between the inlet and outside heat exchanger 56. An outlet of the refrigerant path of evaporator 48 communicates with the suction inlet of compressor 12 via pipes and connection portion 19.

Expansion valve 52 allows a high-pressure refrigerant to expand to a low-temperature and low-pressure state, and discharges the low-temperature and low-pressure refrigerant to evaporator 48. Expansion valve 52 is disposed outside vehicle heat pump apparatus 10, and is connected to the vicinity of evaporator 48.

Outside heat exchanger 56 has a refrigerant flow path and an air flow path, and is disposed in the vicinity of the forefront of the vehicle in the engine compartment, and in outside heat exchanger 56, heat is exchanged between the refrigerant and outside air flowing through each of the paths. An inlet of the refrigerant path of outside heat exchanger 56 communicates with refrigerant outlet pipe 33 of vehicle heat pump apparatus 10 via a pipe. An outlet of the refrigerant path branches into two pipes in the middle of the path, and the two pipes communicate respectively to evaporator 48 and one refrigerant introduction pipe 34 of vehicle heat pump apparatus 10.

During a heating operation, a low-temperature and low-pressure refrigerant flows through outside heat exchanger 56 and absorbs heat from outside air, and during a cooling operation, a high-temperature and high-pressure refrigerant flows through outside heat exchanger 56, and heat is released from a high-temperature and high-pressure refrigerant to outside air. For example, fan F1 blows outside air against outside heat exchanger 56.

Opening and closing valve 60 is provided in the middle of the pipe through which the refrigerant flows from outside heat exchanger 56 to evaporator 48, and is electrically controlled to open and close the pipe.

[Cooling Operation]

Figure 2:
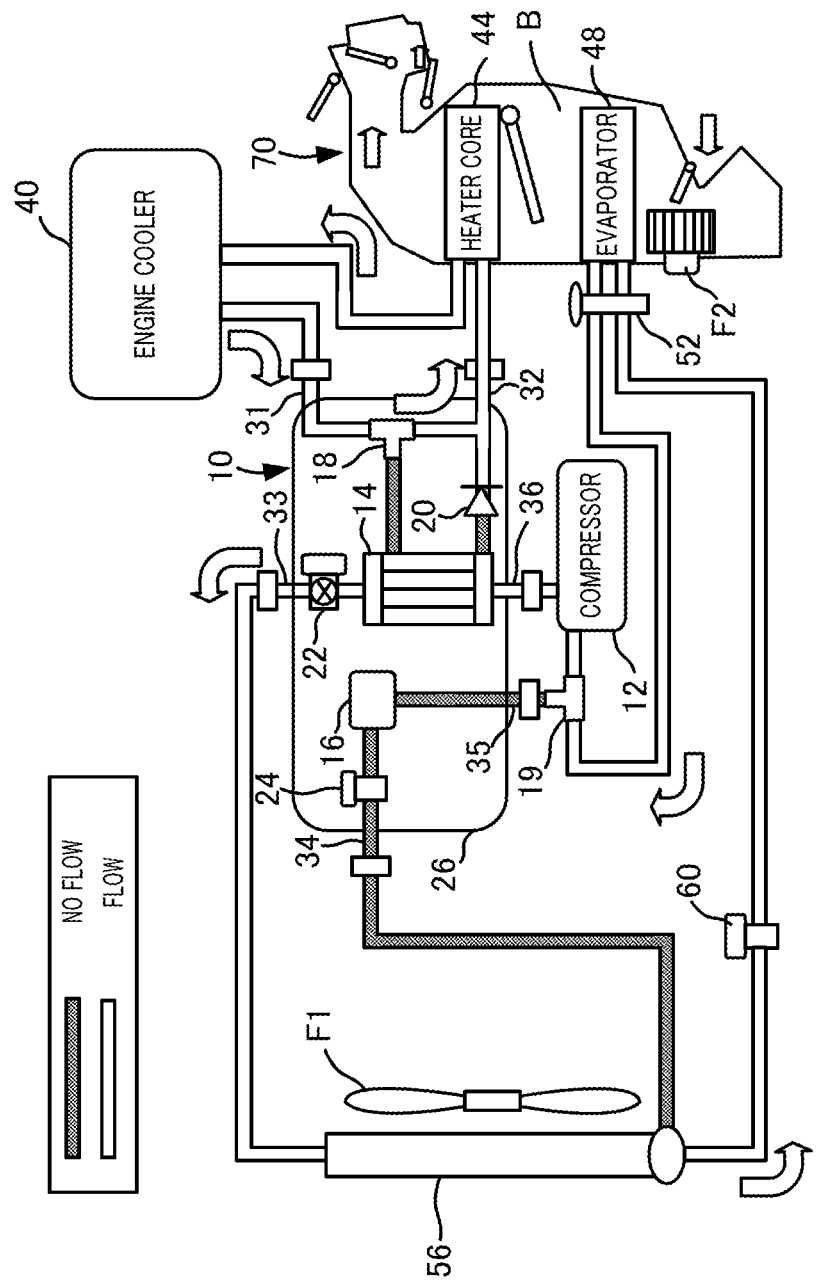
FIG. 2 is a diagram illustrating a cooling operation performed by the vehicle air-conditioning apparatus of Embodiment 1.

FIG. 2 is a diagram illustrating a cooling operation performed by the vehicle air-conditioning apparatus of Embodiment 1. Hatched portions of pipes illustrated in FIG. 2 indicate that the refrigerant or the cooling water does not flow through the hatched portions.

During the cooling operation, opening and closing valve 24 is switched to close, opening and closing valve 60 is switched to open, orifice opening and closing valve 22 is switched to open, and a port of three-way valve 18 connected to cooling water-to-refrigerant heat exchanger 14 is switched to close.

Due to switching, the cooling water circulates through engine cooler 40 and heater core 44, and in contrast, the cooling water does not flow to cooling water-to-refrigerant heat exchanger 14. Since an air mixture damper in intake air path B of HVAC system 70 is switched in order for air not to flow to heater core 44, ventilation air supplied to the vehicle interior is not heated.

After the refrigerant is compressed to a high-temperature and high-pressure state by compressor 12, the high-temperature and high-pressure refrigerant passes through cooling water-to-refrigerant heat exchanger 14 while maintaining a high temperature, and is delivered to outside heat exchanger 56. Thereafter, the refrigerant is cooled in outside heat exchanger 56, and then the cooled refrigerant expands to a low-temperature and low-pressure state while passing through expansion valve 52, and then is delivered to evaporator 48. In evaporator 48, the refrigerant absorbs heat from air to be delivered to the vehicle interior, the air is cooled and the refrigerant evaporates. The evaporated refrigerant returns to compressor 12.

It is possible to deliver cooled air to the vehicle interior via such a heat pump cycle.

[Heating Operation]

Figure 3:
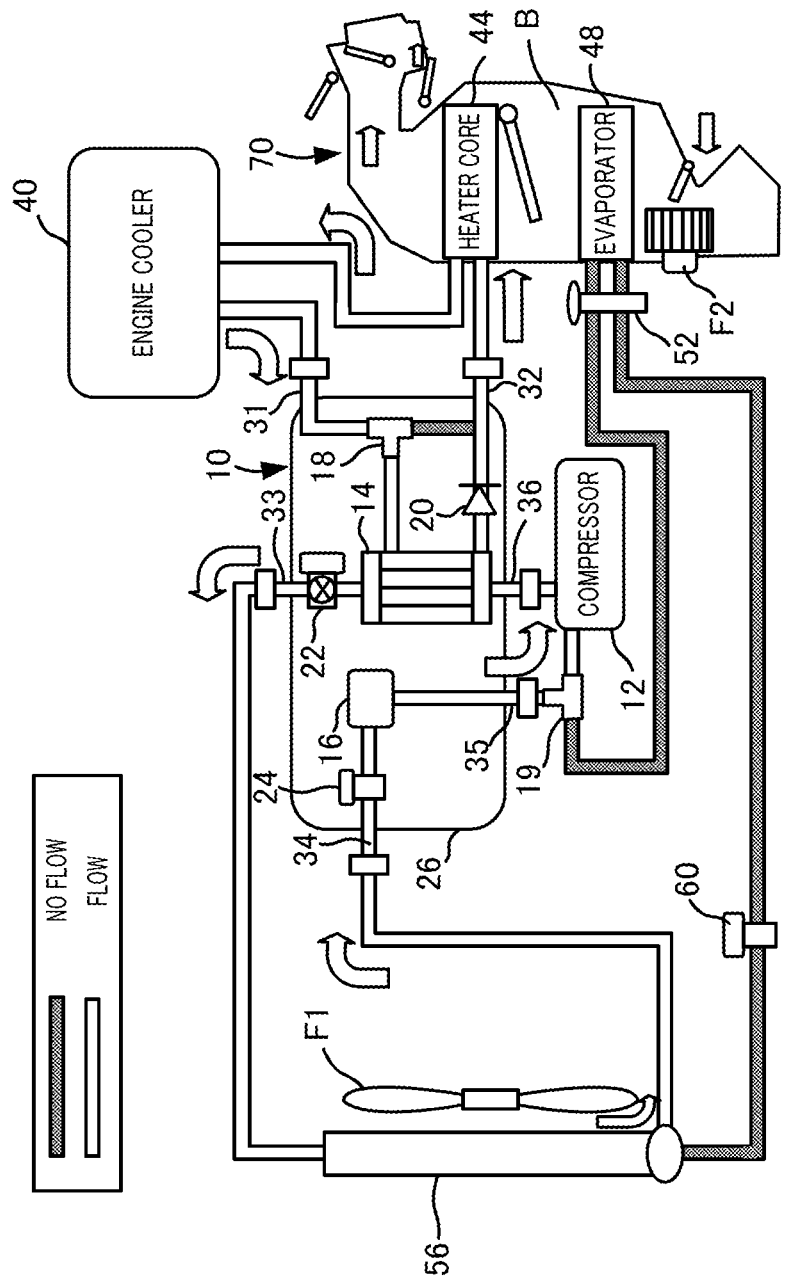
FIG. 3 is a diagram illustrating a heating operation performed by the vehicle air-conditioning apparatus of Embodiment 1.

FIG. 3 is a diagram illustrating a heating operation performed by the vehicle air-conditioning apparatus of Embodiment 1. Hatched portions of pipes illustrated in FIG. 3 indicate that the refrigerant or the cooling water does not flow through the hatched portions.

During the heating operation, opening and closing valve 24 is switched to open, opening and closing valve 60 is switched to close, orifice opening and closing valve 22 is switched to close, and a port of three-way valve 18 connected to cooling water outlet pipe 32 is switched to close.

Due to switching, the cooling water circulates through engine cooler 40, cooling water-to-refrigerant heat exchanger 14, and heater core 44. During the circulation, the cooling water is heated in engine cooler 40 and cooling water-to-refrigerant heat exchanger 14, and in heater core 44, heat is released from the cooling water to air flowing through intake air path B of HVAC system 70.

In vehicle heat pump apparatus 10, heat generated by compressor 12 is transferred to the cooling water in cooling water-to-refrigerant heat exchanger 14.

The air mixture damper in intake air path B is switched to allow air to flow to heater core 44, and air to be delivered to the vehicle interior is warmed.

After the refrigerant is compressed to a high-temperature and high-pressure state by compressor 12, the high-temperature and high-pressure refrigerant releases heat to the cooling water while passing through cooling water-to-refrigerant heat exchanger 14. After heat is released, the high-pressure refrigerant expands to a low-temperature and low-pressure state while passing through orifice opening and closing valve 22, and is delivered to outside heat exchanger 56. In outside heat exchanger 56, the refrigerant absorbs heat from outside air, and the refrigerant evaporates. The evaporated refrigerant returns to compressor 12 via accumulator 16. The refrigerant does not flow through evaporator 48, and heat exchange is not performed in evaporator 48.

It is possible to deliver warm air to the vehicle interior via such an operation. Heat from the engine is effectively used so as to warm air, and a shortage of the engine heat is supplemented by using the heat pump cycle. In addition, heat discharged from compressor 12 is effectively used to warm air. Since the heat pump cycle is used for air heating, it is possible to reduce power consumption per the amount of heating.

[Comparison Between Pipe Paths]

Figure 4:
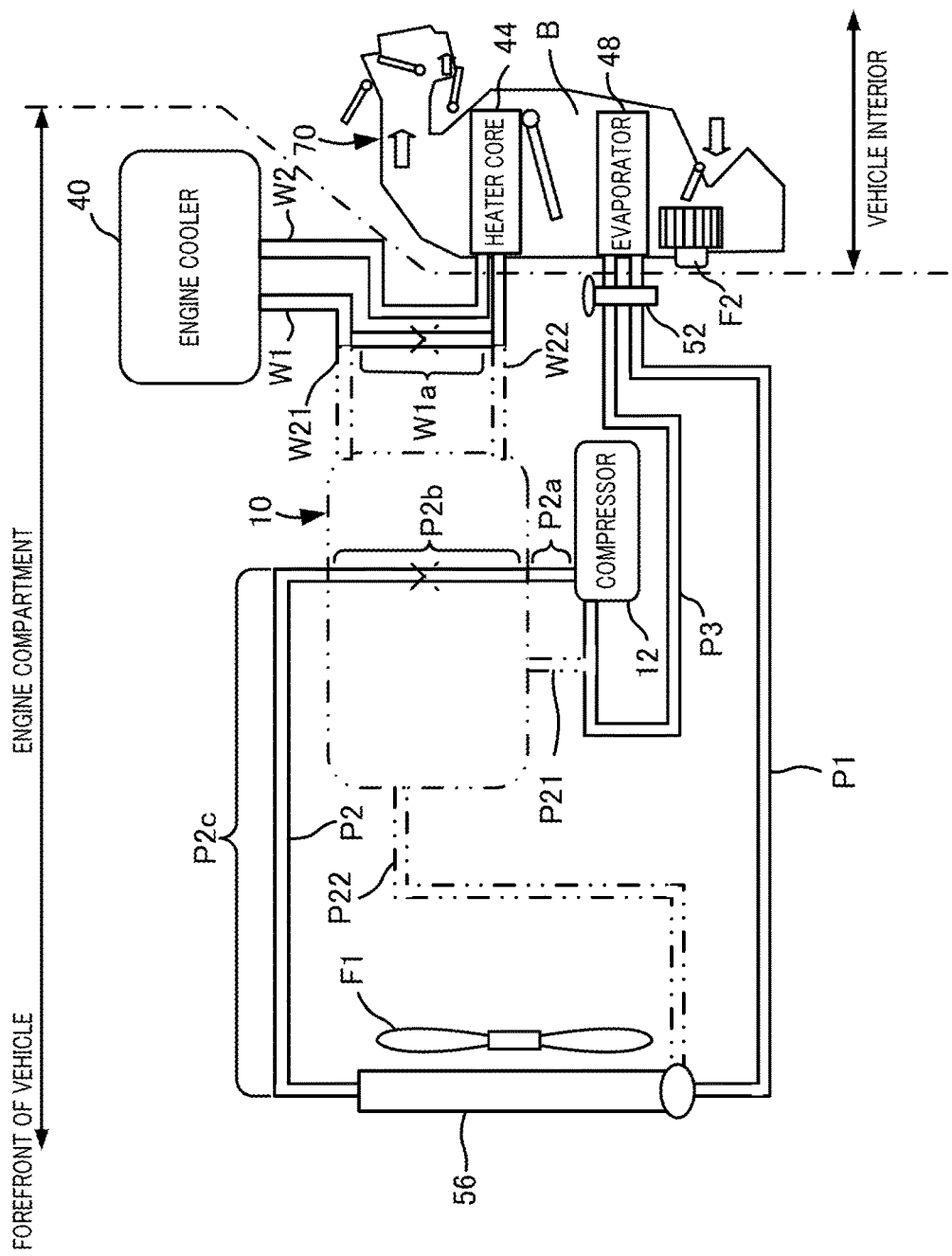
FIG. 4 is a diagram illustrating changes to refrigerant pipes from a conventional vehicle air-conditioning apparatus.

FIG. 4 is a diagram illustrating changes to the refrigerant pipes from the conventional vehicle air-conditioning apparatus. In FIG. 4, solid lines indicate pipes of the conventional vehicle air-conditioning apparatus.

[Regarding Conventional Vehicle Air-Conditioning Apparatus]

In the conventional vehicle air-conditioning apparatus which uses the heat pump cycle only during the cooling operation, outside heat exchanger 56 is disposed in the vicinity of the forefront of the vehicle in the engine compartment, and intake air path B, heater core 44, and evaporator 48 are disposed in HVAC system 70 provided in the vehicle interior. Compressor 12 is disposed in the engine compartment.

In this configuration, refrigerant pipes are illustrated by solid lines in FIG. 4. The refrigerant pipes are made up of only three pipes: pipe P1 running via expansion valve 52 from outside heat exchanger 56 at the forefront of the vehicle in the engine compartment to evaporator 48 in the vehicle interior; pipe P2 running from compressor 12 to outside heat exchanger 56; and pipe P3 running from evaporator 48 in the vehicle interior to compressor 12.

While avoiding collision with other components of the vehicle, each of pipes P1 to P3 is routed on a straight path as much as possible in order for the refrigerant not to undergo a large pressure loss. In particular, the layout of pipe P1 to be installed over a long range is preferentially designed to be a straight path.

Cooling water pipes W1 and W2 are installed between engine cooler 40 in the engine compartment and heater core 44 in HVAC system 70.

A description to be given hereinbelow relates to a case in which the conventional vehicle air-conditioning apparatus configured to use the heat pump cycle only during the cooling operation is changed to perform the heating operation using the heat pump cycle by adopting vehicle heat pump apparatus 10.

A change from the conventional pipes is the addition of two refrigerant pipes P21 and P22. Refrigerant pipe P21 is connected to refrigerant outlet pipe 35 of vehicle heat pump apparatus 10, and refrigerant pipe P22 is connected to refrigerant introduction pipe 34 of vehicle heat pump apparatus 10.

Partial pipe P2b of long pipe P2 provided over the engine compartment is removed, which is another change. In a state where pipe P2b is removed, a part of pipe P2 connected to the refrigerant discharge outlet of compressor 12 is referred to as pipe P2a, and another part of pipe P2 connected to outside heat exchanger 56 is referred to as pipe P2c.

Refrigerant pipe P2a is connected to refrigerant introduction pipe 36 of vehicle heat pump apparatus 10, and refrigerant pipe P2c is connected to refrigerant outlet pipe 33 of vehicle heat pump apparatus 10.

Pipes W21 and W22 are provided between vehicle heat pump apparatus 10 and heater core 44, and the heated cooling water circulates through pipes W21 and W22. Partial pipe W1a of pipe W1 communicating with engine cooler 40 is decoupled, and pipes W21 and W22 are connected to vehicle heat pump apparatus 10 so as to bypass partial pipe W1a. Pipe W21 is connected to cooling water introduction pipe 31, and pipe W22 is connected to cooling water outlet pipe 32.

In cooling water-to-refrigerant heat exchanger 14 of vehicle heat pump apparatus 10, the high-temperature and high-pressure refrigerant compressed by compressor 12 releases heat to the cooling water. The heat is transferred to heater core 44 that warms air in intake air path B of HVAC system 70.

Hereinafter, a case will be discussed where a configuration (refer to FIGS. 21 to 24 in PTL 1) in which the same housing accommodates the compressor and the cooling water-to-refrigerant heat exchanger disclosed in PTL 1 is adopted. In addition, a case will be discussed where the conventional vehicle air-conditioning apparatus configured to use the heat pump cycle only during the cooling operation is changed to perform the heating operation using the heat pump cycle by adopting this configuration.

In this case, it is necessary to replace the compressor of the conventional vehicle air-conditioning apparatus with an apparatus that accommodates the compressor and the cooling water-to-refrigerant heat exchanger in the same housing. For this reason, it is necessary to considerably change a pipe pattern in the vicinity of the compressor.

In Embodiment 1

In contrast, as known from the comparison between FIG. 1 and FIG. 4, the configuration of the embodiment is obtained only by making the following changes to the refrigerant pipes of the conventional vehicle air-conditioning apparatus: refrigerant pipes P21 and P22 are added, and vehicle heat pump apparatus 10 is disposed at a position of partial pipe P2b removed from pipe P2.

Since the disposition of the compressor is not changed, it is possible to easily perform the heating operation using the heat pump cycle while reducing changes in the refrigerant pipe pattern.

In vehicle heat pump apparatus 10 and the vehicle air-conditioning apparatus of the embodiment, the following effects are obtained. That is, it is possible to perform the heating operation using the heat pump cycle by only adding the two pipes to, and removing the partial pipe from the conventional pipes of the vehicle air-conditioning apparatus which uses the heat pump cycle only during the cooling operation.

Accordingly, the embodiment is particularly effective for a case in which the conventional vehicle air-conditioning apparatus originally mounted in a vehicle is replaced with the vehicle air-conditioning apparatus capable of performing the heating operation using the heat pump cycle via a minor change or an optional change. That is, when vehicle heat pump apparatus 10 and spaces for additional refrigerant pipes P21 and P22 are provided, it is possible to apply the vehicle air-conditioning apparatus of the embodiment without affecting the layout of other components of the vehicle. It is possible to configure vehicle heat pump apparatus 10 as a relatively small apparatus, which will be described later, and to easily dispose vehicle heat pump apparatus 10 between configuration elements of the conventional vehicle air-conditioning apparatus.

[Variation 1]

Figure 5:
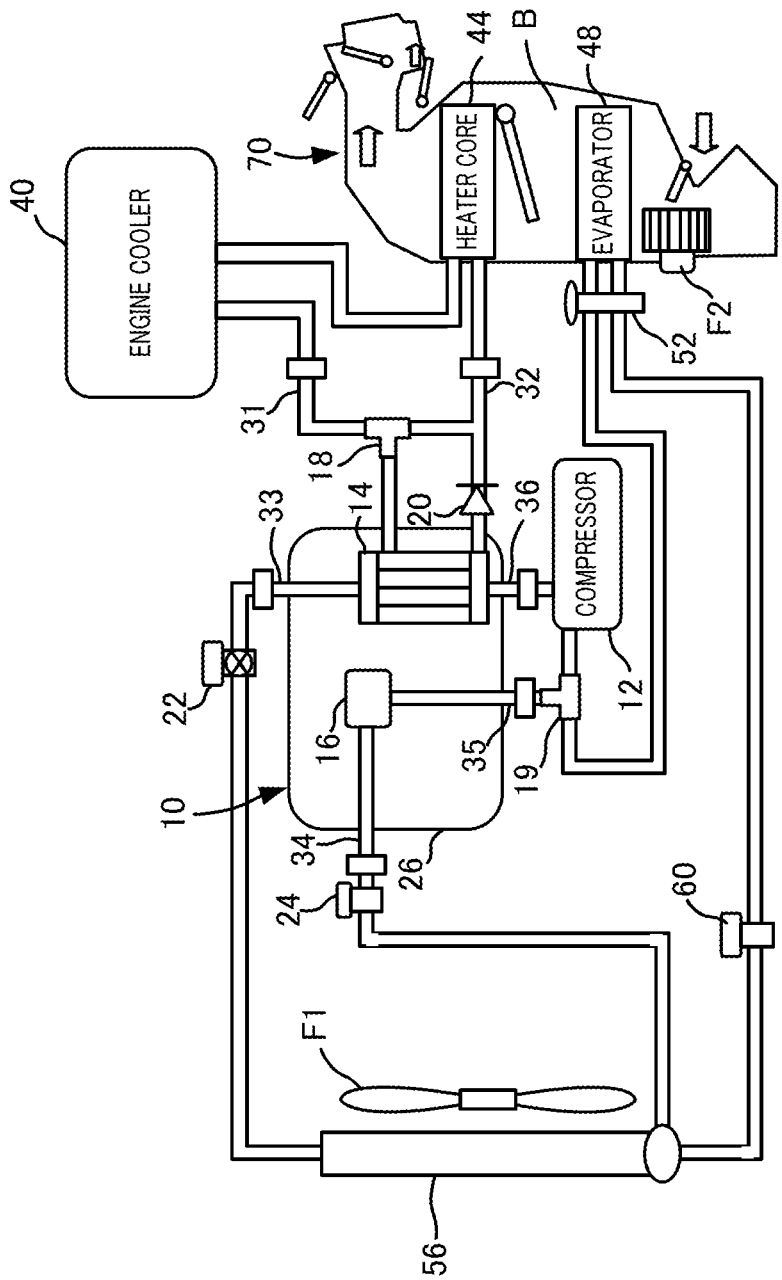
FIG. 5 is a configuration diagram illustrating a variation of the vehicle heat pump apparatus and the vehicle air-conditioning apparatus according to Embodiment 1 of the present invention.

FIG. 5 is a configuration diagram illustrating a variation of the vehicle heat pump apparatus and the vehicle air-conditioning apparatus according to the embodiment of the present invention.

As illustrated in FIG. 5, vehicle heat pump apparatus 10 according to the embodiment of the present invention may have the entirety or any one of the following valves provided outside housing 26: opening and closing valve 24, orifice opening and closing valve 22, three-way valve 18, and check valve 20.

Two opening and closing valves 24 and 60 can be replaced with a three-way valve that is provided at branch locations d1 and d2 of the refrigerant pipe.

The configuration in which the cooling water is allowed to flow while bypassing cooling water-to-refrigerant heat exchanger 14 or via cooling water-to-refrigerant heat exchanger 14 is not limited to the configuration in which three-way valve 18 and check valve 20 are used, and a plurality of opening and closing valves can be configured.

[Variation 2]

Figure 6:
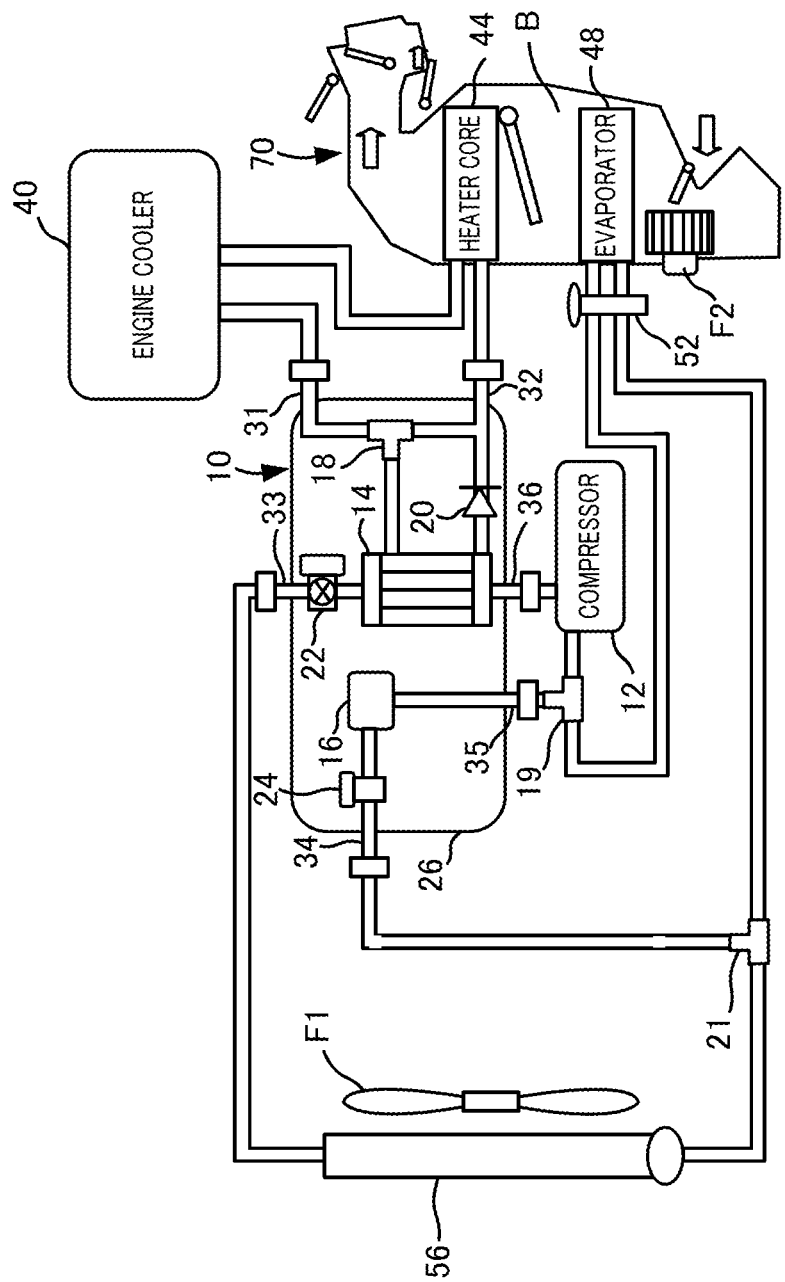
FIG. 6 is a configuration diagram illustrating another variation of the vehicle heat pump apparatus and the vehicle air-conditioning apparatus according to Embodiment 1 of the present invention.

FIG. 6 is a configuration diagram illustrating another variation of the vehicle heat pump apparatus and the vehicle air-conditioning apparatus according to Embodiment 1 of the present invention. A configuration is different from that illustrated in FIG. 5 in that two opening and closing valves 24 and 60 are replaced with one three-way valve 21.

Three-way valve 21 is electrically controlled. During the cooling operation, three-way valve 21 allows the refrigerant passing through outside heat exchanger 56 to be delivered to only evaporator 48. During the heating operation, three-way valve 21 allows the refrigerant passing through outside heat exchanger 56 to be delivered to only refrigerant introduction pipe 34 of vehicle heat pump apparatus 10.

Embodiment 1 of the present invention has been described thus far.

Compressor 12 of the embodiment may include an electric motor configured to drive the compressor mechanism which compresses the suctioned refrigerant and discharges the compressed refrigerant. Compressor 12 of the embodiment may drive the compressor mechanism by transmitting driving force from the outside of compressor 12, for example, driving force of the internal combustion engine, to the compressor mechanism via a belt or the like.

In the embodiment, a pipe is configured as a refrigerant introduction section or a refrigerant outlet section of vehicle heat pump apparatus 10; however, the refrigerant introduction section or the refrigerant outlet section may be configured as a connector or a socket for pipe connection embedded in a wall of housing 26. Similarly, the cooling water introduction section or the cooling water outlet section may be configured as a connector or a socket for pipe connection embedded in a wall of housing 26.

In the description of the embodiment, the cooling water absorbing heat from the internal combustion engine is supplied to the heater core; however, a configuration in which the cooling water flows from only vehicle heat pump apparatus 10 to heater core 44 may be adopted.

A new vehicle air-conditioning apparatus and a new vehicle heat pump apparatus of the embodiment may be mounted in a vehicle. The vehicle heat pump of the embodiment may replace a part of the conventional vehicle air-conditioning apparatus which uses the heat pump cycle only during the cooling operation illustrated in FIG. 4. By virtue of the replacement, it is possible to realize the vehicle air-conditioning apparatus of the embodiment, and to perform the heating operation using the heat pump cycle.

Embodiment 2

Background and Problem Related to Embodiment 2

There is an automobile provided with both of an internal combustion engine and an electric motor, a so-called hybrid electric vehicle (HEV) or a plug-in hybrid vehicle (PHV). In these vehicles, since it is not possible to obtain heat from the internal combustion engine during motor drive mode, a vehicle air-conditioning apparatus configured to perform a heating operation using a heat pump cycle is adopted. The same situation applies to an electric vehicle (EV) in which an internal combustion engine is not mounted.

A vehicle air-conditioning apparatus disclosed in PTL 1 (Japanese Patent Application Laid-Open No. HEI 8-197937) includes a compressor that compresses a refrigerant; an evaporator for cooling disposed in a duct through which air is guided to a vehicle interior; an expansion valve that supplies a low-temperature and low-pressure refrigerant to the evaporator; and a plurality of heat exchangers that heat air in the duct using a refrigerant's heat transferred by a secondary refrigerant (for example, cooling water).

In the vehicle air-conditioning apparatus, during the heating operation, a considerable amount of heat exchange cannot be performed in the evaporator for cooling. The reason for this is that unnecessary cooling is provided to the vehicle interior. Accordingly, the vehicle air-conditioning apparatus may be provided with a branch circuit for heating which allows the refrigerant to flow therethrough without the intervention of the evaporator for cooling and the expansion valve. Here, the circuit refers to one turn of a refrigerant path through which the refrigerant circulates.

In the vehicle air-conditioning apparatus, during the heating operation, the heat pump cycle is realized by using a heat exchanger (outside heat exchanger) and an expansion valve provided separately in the branch circuit without allowing the refrigerant to flow through the evaporator. Accordingly, the refrigerant absorbs heat from outside air, and heating is provided to the vehicle interior using the heat (for example, refer to FIG. 1 in PTL 1).

In a state where the vehicle air-conditioning apparatus adopts the branch circuit for heating which allows the refrigerant to flow therethrough without the intervention of the evaporator and the expansion valve, and when there is no implementation of any specific scheme, opening and closing valves are respectively provided in the branch circuit for heating and a refrigerant circuit for cooling, and the flow of the refrigerant is switched between the heating operation and the cooling operation. However, there is a problem in that this configuration causes an increase in the number of components of the air-conditioning apparatus.

In contrast, in an air-conditioning apparatus illustrated in FIG. 1 in PTL 1, an opening and closing valve is not provided on a refrigerant path of evaporator (25) and expansion valve (24), and opening and closing valve (28) is provided on bypass path (42) that bypasses the path.

However, this configuration has a problem in that even during the heating operation in which the opening and closing valve for opening and closing the bypass path is opened, a relatively considerable amount of the refrigerant flows through evaporator (25) and expansion valve (24). The unnecessary flow of the refrigerant leads to a decrease in air-conditioning performance.

In addition, during the heating operation, when the refrigerant passes through the expansion valve, and flows to the evaporator at a low outdoor temperature, the evaporator may become frozen, which is a problem.

An object of this embodiment is to reduce the number of components and to prevent a refrigerant from unnecessarily flowing during a heating operation in a vehicle air-conditioning apparatus having the branch circuit for heating that allows the refrigerant to flow therethrough without the intervention of an evaporator and an expansion valve.

Description of Embodiment 2

Figure 7:
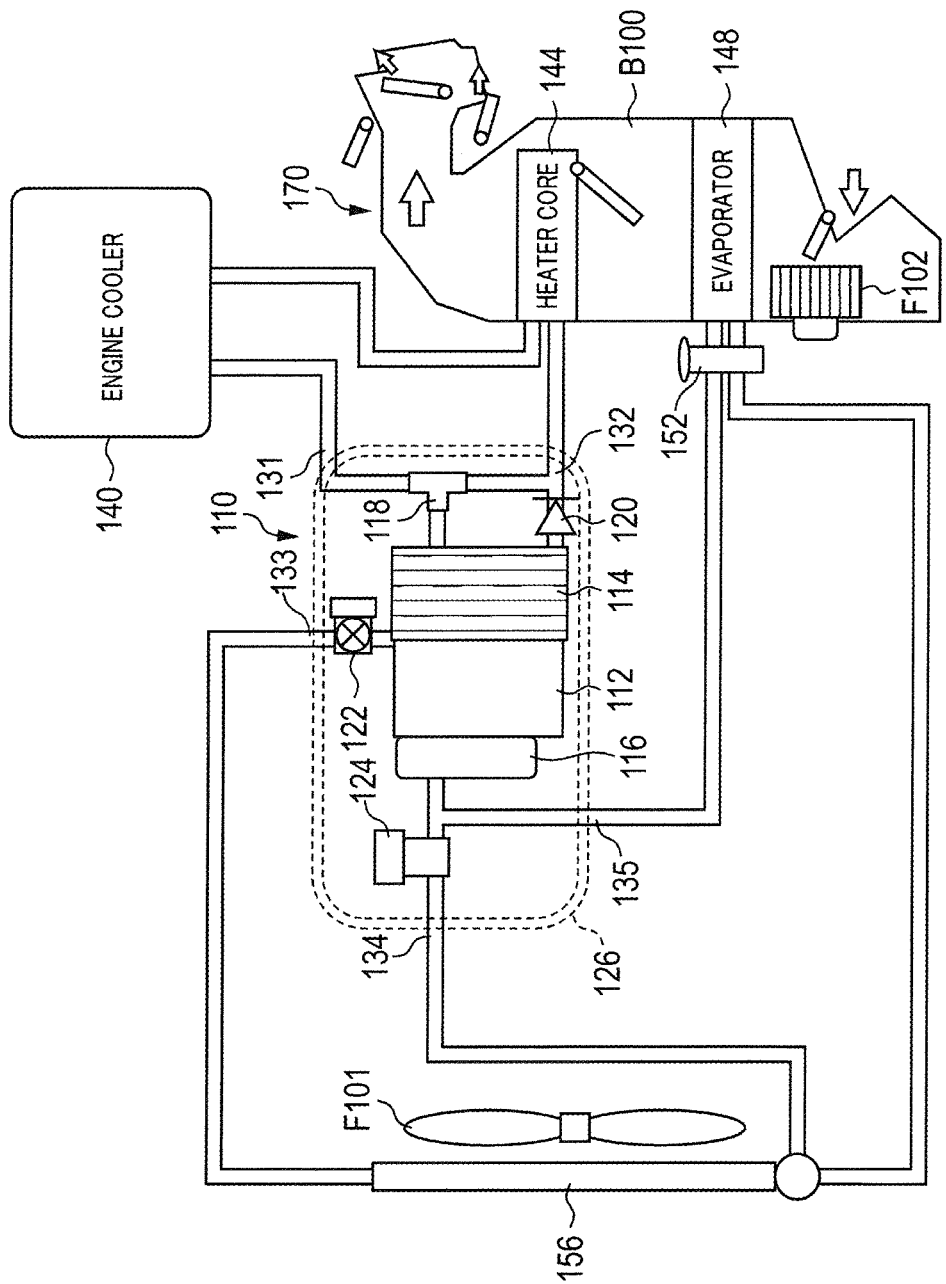
FIG. 7 is a configuration diagram illustrating a vehicle air-conditioning apparatus according to Embodiment 2 of the present invention.

FIG. 7 is a configuration diagram illustrating a vehicle heat pump apparatus and a vehicle air-conditioning apparatus according to Embodiment 2 of the present invention.

The vehicle air-conditioning apparatus of Embodiment 2 of the present invention includes vehicle heat pump apparatus 110; engine cooler 140; heater core 144; evaporator 148; expansion valve 152; outside heat exchanger 156; refrigerant pipes and cooling water pipes which connect the configuration elements; and the like.

Vehicle heat pump apparatus 110 includes electric compressor 112; cooling water-to-refrigerant heat exchanger 114; accumulator 116; three-way valve 118; check valve 120; orifice opening and closing valve 122; opening and closing valve 124; housing 126; cooling water introduction pipe 131; cooling water outlet pipe 132; one refrigerant outlet pipe 133; and two refrigerant introduction pipes 134 and 135.

Electric compressor 112 is electrically driven to compress the suctioned refrigerant to a high-temperature and high-pressure state, and to discharge the compressed refrigerant. A suction inlet for the refrigerant in electric compressor 112 communicates with two refrigerant introduction pipes 134 and 135 via accumulator 116, and a refrigerant discharge outlet of electric compressor 112 communicates with an inlet of a refrigerant path of cooling water-to-refrigerant heat exchanger 114.

Cooling water-to-refrigerant heat exchanger 114 has a cooling water path and a refrigerant path, and the cooling water path and the refrigerant path are configured to be in large area contact with each other so that a large amount of heat exchange can be performed therebetween. An inlet of the refrigerant path communicates with the discharge outlet of electric compressor 112, and an outlet of the refrigerant path communicates with refrigerant outlet pipe 133 provided with orifice opening and closing valve 122. An inlet of the cooling water path is connected to three-way valve 118 via a pipe, and an outlet for the cooling water is connected to check valve 120 via a pipe.

The high-temperature and high-pressure refrigerant flows through cooling water-to-refrigerant heat exchanger 114 while electric compressor 112 is driven, and in contrast, the cooling water is made to flow or not to flow through cooling water-to-refrigerant heat exchanger 114 by the switching of the three-way valve. When the cooling water flows through cooling water-to-refrigerant heat exchanger 114, heat is released from the high-temperature and high-pressure refrigerant to the cooling water, and when the cooling water does not flow therethrough, the high-temperature and high-pressure refrigerant passes through cooling water-to-refrigerant heat exchanger 114 while maintaining substantially the same high temperature.

Three-way valve 118 is switched by electric control to allow the cooling water introduced from cooling water introduction pipe 131 to flow to either one of cooling water-to-refrigerant heat exchanger 114 and cooling water outlet pipe 132.

Check valve 120 prevents a reverse flow of the cooling water to cooling water-to-refrigerant heat exchanger 114.

Orifice opening and closing valve 122 is an opening and closing valve having the function of an expansion valve, and is switched to open or closed by electric control. For example, orifice opening and closing valve 122 has a large-diameter path and an orifice made up of a small-diameter path, and the large-diameter path is configured to be openable and closeable. When the large-diameter path is opened, orifice opening and closing valve 122 allows the refrigerant to pass therethrough, and when the large-diameter path is closed, a high-pressure refrigerant expands via the path of the orifice. The expanded refrigerant becomes a low-temperature and low-pressure refrigerant.

Opening and closing valve 124 is provided between an inlet of refrigerant introduction pipe 134 and a junction of two refrigerant introduction pipes 134 and 135, and opens and closes a path between the inlet and the junction by electric control.

Accumulator 116 separates a gaseous refrigerant from a liquefied refrigerant, and delivers only the gaseous refrigerant to electric compressor 112.

Each of three-way valve 118, orifice opening and closing valve 122, and opening and closing valve 124 switches between an open state and a closed state in response to an electric signal transmitted from a control section of the vehicle air-conditioning apparatus. Alternatively, each of three-way valve 118, orifice opening and closing valve 122, and opening and closing valve 124 may be configured to switch between an open state and a closed state in response to a signal that is output by a control section of vehicle heat pump apparatus 110 based on a command from the control section of the vehicle air-conditioning apparatus.

Housing 126 accommodates electric compressor 112, cooling water-to-refrigerant heat exchanger 114, accumulator 116, three-way valve 118, check valve 120, orifice opening and closing valve 122, and opening and closing valve 124, and integrates these configuration elements into a single package. The surrounding of housing 126 may be insulated, and electric compressor 112 and cooling water-to-refrigerant heat exchanger 114 may be disposed close together in housing 126 so that heat exchange can be made therebetween.

An end of each of refrigerant outlet pipe 133 and refrigerant introduction pipes 134 and 135 is exposed to the outside of housing 126, and is connected to the refrigerant pipes of the vehicle air-conditioning apparatus. A connector or a socket for pipe connection may be provided at the end of each of refrigerant outlet pipe 133 and refrigerant introduction pipes 134 and 135.

An end of each of cooling water introduction pipe 131 and cooling water outlet pipe 132 is exposed to the outside of housing 126, and is connected to the cooling water pipes of the vehicle air-conditioning apparatus. A connector or a socket for pipe connection may be provided at the end of each of cooling water introduction pipe 131 and cooling water outlet pipe 132.

Engine cooler 140 includes a water jacket that allows the cooling water to flow around the internal combustion engine, and a pump that makes the cooling water flow through the water jacket. Heat is released from the internal combustion engine to the cooling water flowing through the water jacket. The cooling water absorbing heat from the internal combustion engine passes through heater core 144, and heat can be released from the cooling water via a radiator (not illustrated). For example, the radiator is disposed at a front face of a vehicle. When the temperature of the cooling water is lower than a predetermined temperature, an opening and closing valve (not illustrated) provided in a cooling water circuit is closed, and the cooling water circulates through the internal combustion engine and heater core 144, or the internal combustion engine and vehicle heat pump apparatus 110. For example, the opening and closing valve (not illustrated) may be a thermostat. An outlet and an inlet of a cooling water path of the water jacket are connected respectively to heater core 144 and cooling water introduction pipe 131 of vehicle heat pump apparatus 110.

Heater core 144 is a section in which the cooling water exchanges heat with air, and is disposed in intake air path B100 of HVAC system 170, through which air is supplied to a vehicle interior. A cooling water path of heater core 144 communicates with engine cooler 140 and cooling water outlet pipe 132 of vehicle heat pump apparatus 110. Intake air path B100 is disposed in the vicinity of the vehicle interior, and fan F102 introduces outside air or the like to intake air path B100.

Evaporator 148 is a section in which the refrigerant expanded to a low-temperature and low-pressure state exchanges heat with air, and is disposed in intake air path B100 of HVAC system 170. When the refrigerant expanded to a low-temperature and low-pressure state passes through evaporator 148, the low-temperature and low-pressure refrigerant evaporates by absorbing heat from air. An inlet of a refrigerant path of evaporator 148 communicates with outside heat exchanger 156 via expansion valve 152. An outlet of the refrigerant path of evaporator 148 communicates with refrigerant introduction pipe 135 of the vehicle heat pump apparatus via the pipe.

In intake air path B100 of HVAC system 170, evaporator 148 is disposed at a position in which outside air is introduced, and heater core 144 is disposed in the vicinity of a ventilation air port connected to the vehicle interior.

Expansion valve 152 allows a high-pressure refrigerant to expand to a low-temperature and low-pressure state, and delivers the low-temperature and low-pressure refrigerant to evaporator 148. Expansion valve 152 is disposed in the vicinity of evaporator 148. Expansion valve 152 will be described in detail later.

Outside heat exchanger 156 has a refrigerant flow path and an air flow path, and is disposed in the vicinity of the forefront of the vehicle, and in outside heat exchanger 156, heat is exchanged between the refrigerant and outside air flowing through each of the paths. An inlet of the refrigerant path of outside heat exchanger 156 communicates with refrigerant outlet pipe 133 of vehicle heat pump apparatus 110 via a pipe. An outlet of the refrigerant path of outside heat exchanger 156 branches into two pipes in the middle of the path, and the two pipes communicate respectively to evaporator 148 and refrigerant introduction pipe 134 of vehicle heat pump apparatus 110.

During a heating operation, a low-temperature and low-pressure refrigerant flows through outside heat exchanger 156 and absorbs heat from outside air, and during a cooling operation, a high-temperature and high-pressure refrigerant flows through outside heat exchanger 156, and releases heat to outside air. For example, fan F101 blows outside air against outside heat exchanger 156.

[Details of Expansion Valve]

Figure 8:
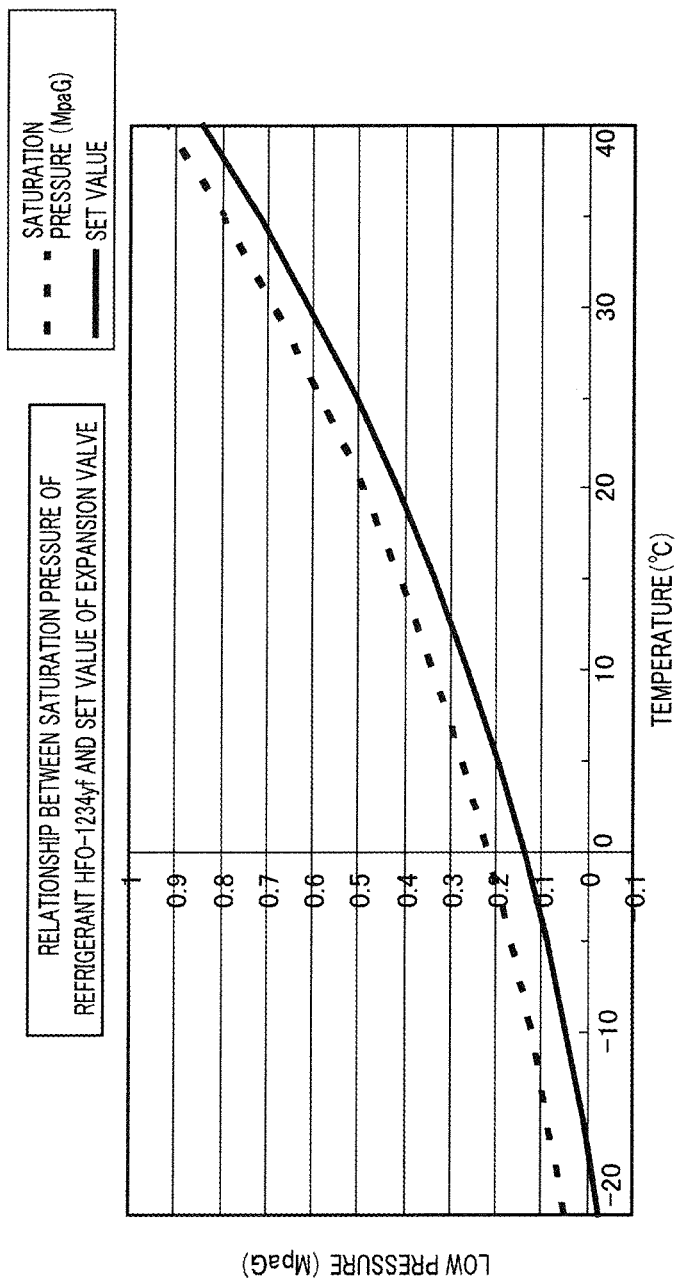
FIG. 8 is a graph illustrating examples of the set values of an expansion valve.
Figure 9:
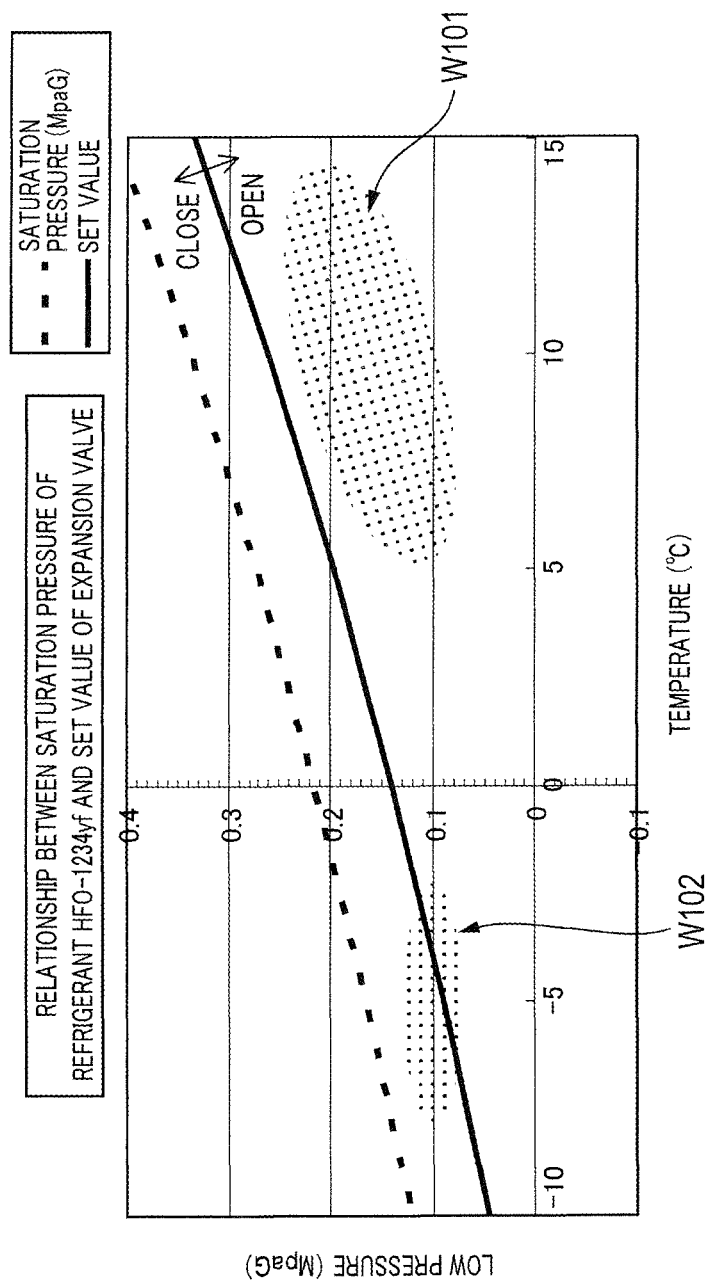
FIG. 9 is a graph illustrating states of the expansion valve during the heating operation and the cooling operation.

FIG. 8 is a graph illustrating examples of the set values of the expansion valve, and FIG. 9 is a graph illustrating states of the expansion valve during the heating operation and the cooling operation.

Expansion valve 152 is provided with a temperature detection section that detects temperature, and a valve that is opened and closed by the operation of the temperature detection section and is opened to allow the refrigerant to pass therethrough and to expand. For example, expansion valve 152 of the embodiment is a gas sealed expansion valve that has a refrigerant sealed therein, the type of the refrigerant being the same as that of the temperature detection section in use, and expansion valve 152 has a mechanism of being opened and closed mechanically. Specifically, expansion valve 152 has a structure in which a pressure differential between the pressure of the sealed gas in the temperature detection section and the pressure of a low-pressure refrigerant works against a spring pressure that closes the valve. The temperature detection section detects a refrigerant outlet temperature while being in contact with a refrigerant outlet section of evaporator 148. When the pressure differential exceeds the spring pressure, the valve is opened, and the refrigerant passes through the valve and expands.

When Hydro-Fluoro-Olefin (HFO)-1234yf is used as a refrigerant of a heat pump cycle, the set value of expansion valve 152 is determined as follows.

When the detected temperature is 0° C., the set value is included in 0.10 MPa (G: gauge pressure) to 0.14 MPa (G).

When the detected temperature is 10° C., the set value is included in 0.21 MPa (G) to 0.26 MPa (G).

More preferably, when HFO-1234yf is used as a refrigerant, the set value of expansion valve 152 may be determined as follows.

When the detected temperature is 0° C., the set value is included in 0.12 MPa (G) to 0.14 MPa (G).

When the detected temperature is 10° C., the set value is included in 0.23 MPa (G) to 0.26 MPa (G).

Here, the set value indicates the pressure ((G) in the pressure unit indicates atmospheric reference pressure, that is, gauge pressure) of a low-pressure refrigerant, at which expansion valve 152 is closed from an open state, and is dependent on the refrigerant outlet temperature (temperature detected by the temperature detection section) of evaporator 148.

In each of the graphs in FIGS. 8 and 9, the set values of expansion valve 152 are illustrated.

When R134a is used as a refrigerant of the heat pump cycle, the set value of expansion valve 152 is determined as follows. R134a is also referred to as Hydro-Fluoro-Carbon (HFC)-134a.

When the detected temperature is 0° C., the set value is included in 0.08 MPa (G) to 0.12 MPa (G).

When the detected temperature is 10° C., the set value is included in 0.19 MPa (G) to 0.24 MPa (G).

More preferably, when R134a is used as a refrigerant, the set value of expansion valve 152 may be determined as follows.

When the detected temperature is 0° C., the set value is included in 0.10 MPa (G) to 0.12 MPa (G).

When the detected temperature is 10° C., the set value is included in 0.21 MPa (G) to 0.24 MPa (G).

As illustrated in FIG. 9, when the set value is set as described above, during a stable cooling operation, the pressure of the low-pressure refrigerant and the refrigerant outlet temperature of evaporator 148 are approximately included in range W101. Accordingly, during the stable cooling operation, expansion valve 152 is stably opened.

In contrast, during a stable heating operation, the pressure of the low-pressure refrigerant and the refrigerant outlet temperature of evaporator 148 are approximately included in range W102. Since air blowing against evaporator 148 in intake air path B100 is mainly outside air, when the refrigerant does not flow through evaporator 148, the temperature (refrigerant outlet temperature of evaporator 148) detected by expansion valve 152 is substantially the same as the outdoor temperature.

As a result, when the detected temperature is lower than a range of −3° C. to −7° C., expansion valve 152 operates to close. As described above, the detected temperature of expansion valve 152 when expansion valve 152 is closed becomes substantially the same as the outdoor temperature. Accordingly, at the outdoor temperature (temperature greater than "−7° C. to −3° C.") at which a dehumidification operation is required to be performed, it is possible to perform the dehumidification operation by less frequently opening expansion valve 152 via the aforementioned opening and closing operation.

For example, when the outdoor temperature is −5° C., the saturation pressure of the refrigerant is 0.15 MPa (G), and the saturation pressure is 0.06 MPa (G) or less, expansion valve 152 is opened.

In contrast, at a low outdoor temperature (temperature lower than "−7° C. to −3° C.") at which the dehumidification operation is not required to be performed, expansion valve 152 is closed, and the refrigerant does not flow to evaporator 148 by the aforementioned opening and closing operation. Accordingly, an unnecessary flow of the refrigerant is prevented, and a decrease in air-conditioning performance is prevented. In addition, evaporator 148 is prevented from being frozen, which would otherwise occur due to an excessive decrease in the temperature of evaporator 148.

In the vehicle air-conditioning apparatus of the embodiment, an opening and closing valve is not provided on a path of expansion valve 152 and evaporator 148. In the vehicle air-conditioning apparatus of the embodiment, since expansion valve 152 is automatically opened and closed, it is possible to realize an appropriate flow of the refrigerant during the heating operation and the cooling operation. For this reason, it is not necessary to provide the opening and closing valve on a path of expansion valve 152 and evaporator 148, and to control the opening and closing of the path.

A description to be given hereinbelow relates to an operation of the vehicle air-conditioning apparatus of the embodiment during the cooling operation, and during the heating operation when the outdoor temperature is very low.

[Cooling Operation]

Figure 10:
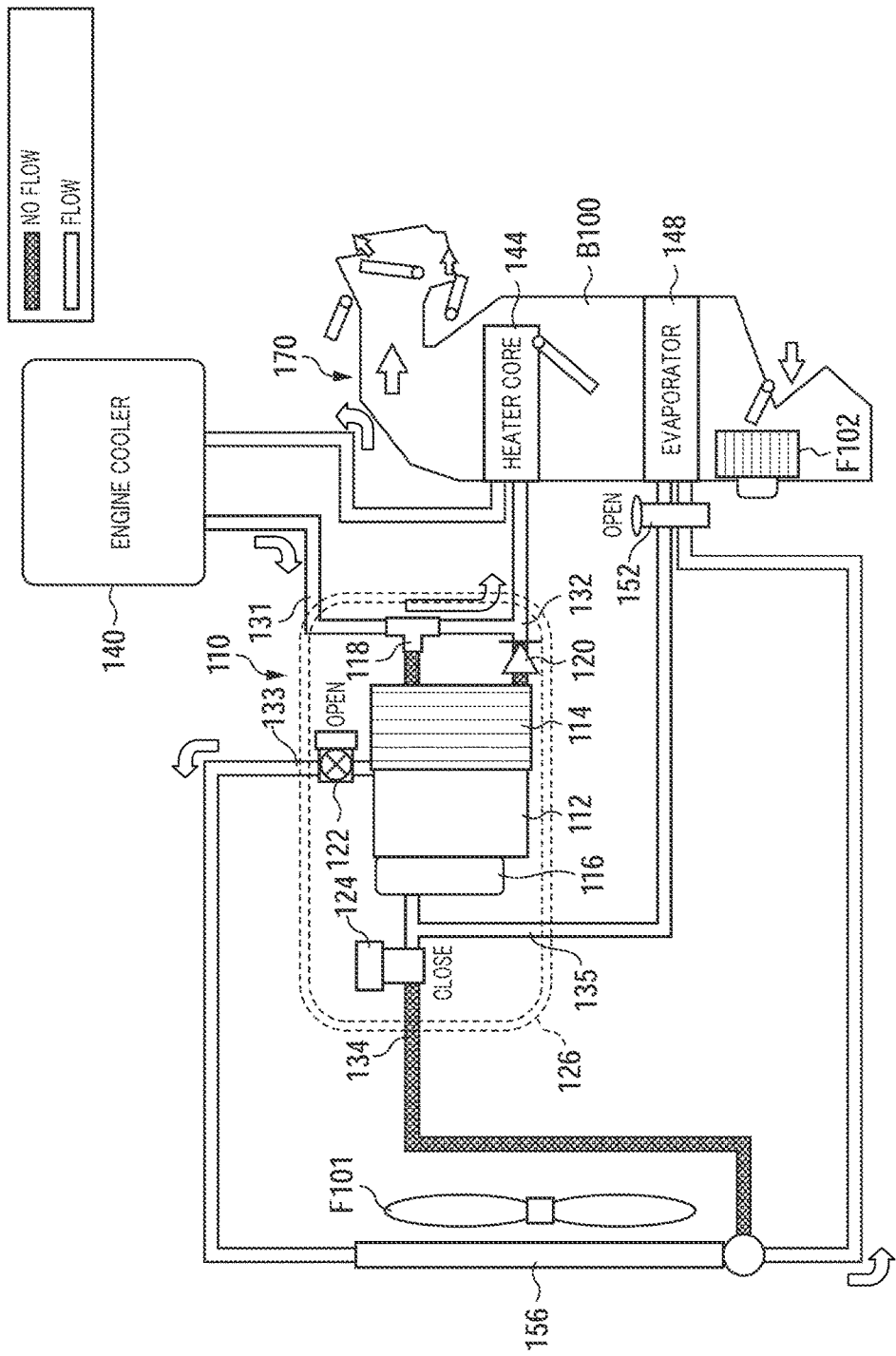
FIG. 10 is a diagram illustrating a state of a cooling operation performed by the vehicle air-conditioning apparatus of Embodiment 2.

FIG. 10 is a diagram illustrating a cooling operation performed by the vehicle air-conditioning apparatus of Embodiment 2. Hatched portions of pipes illustrated in FIG. 10 indicate that the refrigerant or the cooling water does not flow through the hatched portions.

During the cooling operation, opening and closing valve 124 is switched to close, orifice opening and closing valve 122 is switched to open, and a port of three-way valve 118 connected to cooling water-to-refrigerant heat exchanger 114 is switched to close.

Due to switching, the cooling water circulates through engine cooler 140 and heater core 144, and in contrast, the cooling water does not flow to cooling water-to-refrigerant heat exchanger 114. Since a louver or the like in intake air path B100 is switched in order for air not to flow to heater core 144, ventilation air supplied to the vehicle interior is not heated.

After the refrigerant is compressed to a high-temperature and high-pressure state by electric compressor 112, the high-temperature and high-pressure refrigerant passes through cooling water-to-refrigerant heat exchanger 114 while maintaining a high temperature, and is delivered to outside heat exchanger 156. Thereafter, the refrigerant is cooled in outside heat exchanger 156, and then the cooled refrigerant expands to a low-temperature and low-pressure state while passing through expansion valve 152, and then is delivered to evaporator 148. In evaporator 148, the refrigerant absorbs heat from air to be delivered to the vehicle interior, the air is cooled and the refrigerant evaporates. The evaporated refrigerant returns to electric compressor 112 via accumulator 116.

It is possible to deliver cooled air to the vehicle interior via such a heat pump cycle.

[Heating Operation]

Figure 11:
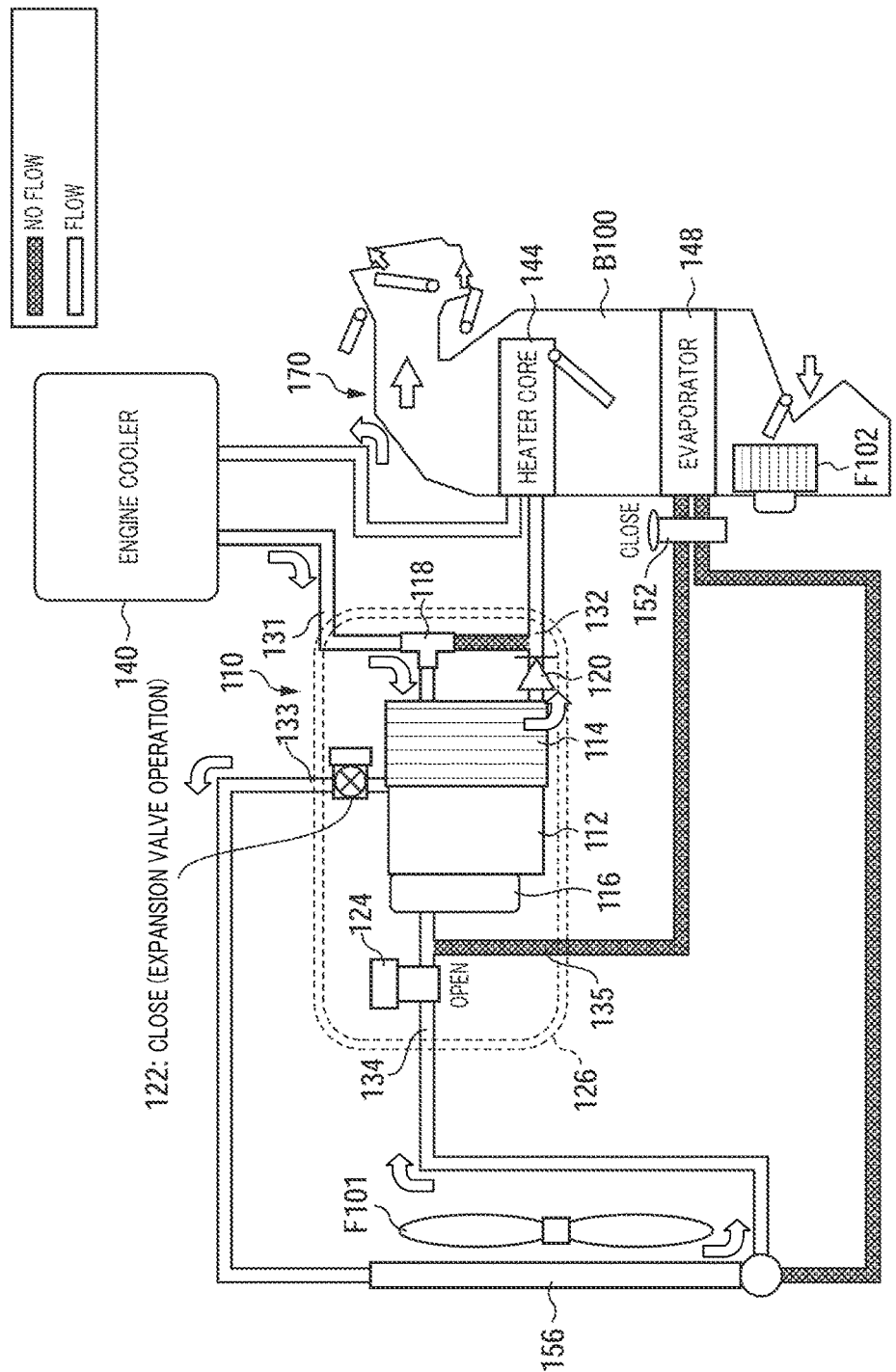
FIG. 11 is a diagram illustrating a state of a heating operation performed by the vehicle air-conditioning apparatus of Embodiment 2 when outdoor temperature is very low.

FIG. 11 is a diagram illustrating a heating operation performed by the vehicle air-conditioning apparatus of Embodiment 2 when the outdoor temperature is very low. Hatched portions of pipes illustrated in FIG. 11 indicate that the refrigerant or the cooling water does not flow through the hatched portions.

During the heating operation, opening and closing valve 124 is switched to open, orifice opening and closing valve 122 is switched to close, and a port of three-way valve 118 connected to cooling water outlet pipe 132 is switched to close.

Due to switching, the cooling water circulates through engine cooler 140, cooling water-to-refrigerant heat exchanger 114, and heater core 144. During the circulation, the cooling water is heated in engine cooler 140 and cooling water-to-refrigerant heat exchanger 114, and in heater core 144, heat is released from the cooling water to air flowing through intake air path B100.

In addition, in vehicle heat pump apparatus 110, heat generated by electric compressor 112 is transferred to the cooling water in cooling water-to-refrigerant heat exchanger 114, and the heat discharged from electric compressor 112 is also used as a heat source.

The louver or the like in intake air path B100 is switched to allow air to flow to heater core 144, and air to be delivered to the vehicle interior is warmed.

After the refrigerant is compressed to a high-temperature and high-pressure state by electric compressor 112, the high-temperature and high-pressure refrigerant releases heat to the cooling water while passing through cooling water-to-refrigerant heat exchanger 114. After heat is released, the high-pressure refrigerant expands to a low-temperature and low-pressure state while passing through orifice opening and closing valve 122, and is delivered to outside heat exchanger 156. In outside heat exchanger 156, the refrigerant absorbs heat from outside air, and the refrigerant evaporates. The evaporated refrigerant returns to electric compressor 112 via accumulator 116.

When the outdoor temperature is low (for example, −3° C. to −7° C. or less), expansion valve 152 is automatically closed. At this time, the refrigerant does not flow through evaporator 148, and heat exchange is not performed in evaporator 148.

It is possible to deliver warm air to the vehicle interior via such an operation. Heat from the engine is effectively used so as to warm air, and a shortage of the engine heat is supplemented by using the heat pump cycle. In addition, heat discharged from electric compressor 112 is effectively used to warm air. Since the heat pump cycle is used for air heating, it is possible to reduce power consumption per the amount of heating. When outdoor temperature is low, expansion valve 152 is closed, and the refrigerant does not unnecessarily flow through expansion valve 152 and evaporator 148, and thereby there is no decrease in air-conditioning performance associated with an unnecessary flow of the refrigerant.

As described above, in the vehicle air-conditioning apparatus of the embodiment, during a stable cooling operation, the opening of expansion valve 152 is stable via the setting of the set value of expansion valve 152, and allows the refrigerant to pass therethrough and to expand. In contrast, when there is a low outdoor temperature at which the dehumidification operation is not required to be performed, during a stable heating operation, expansion valve 152 is automatically closed, and the refrigerant is not allowed to flow therethrough and to expand.

Accordingly, even though an opening and closing valve is not provided on a path of expansion valve 152 and evaporator 148, and the opening and closing of the path is not controlled, since expansion valve 152 is automatically opened and closed, it is possible to control an appropriate flow of the refrigerant during the heating operation and the cooling operation.

Since expansion valve 152 is automatically opened and closed, when there is a low outdoor temperature at which the dehumidification operation is not required to be performed, the refrigerant is prevented from unnecessarily flowing through expansion valve 152 and evaporator 148, and a decrease in air-conditioning performance is prevented. In addition, evaporator 148 is prevented from being frozen, which would otherwise occur due to an excessive decrease in the temperature of evaporator 148.

Embodiment 2 of the present invention has been described thus far.

The description of the embodiment has been given with the exemplary configuration in which heating is provided to the vehicle interior, the cooling water, that is, a secondary refrigerant, is heated by the heat pump cycle, and heat is released from the cooling water to air via heater core 144. However, the configuration in which heating is provided to the vehicle interior is not limited to the one that is described in the embodiment, and various modifications can be made.

The disclosures of Japanese Patent Applications No. 2012-267085, filed on Dec. 6, 2012, and No. 2012-276498, filed on Dec. 19, 2012, including the specifications, drawings and abstracts are incorporated herein by reference in their entireties.

INDUSTRIAL APPLICABILITY

The present invention can be applied to a vehicle heat pump apparatus and a vehicle air-conditioning apparatus which are mounted in a vehicle.

REFERENCE SIGNS LIST

10 Vehicle heat pump apparatus (Embodiment 1)
12 Compressor
14 Cooling water-to-refrigerant heat exchanger
16 accumulator 18 Three-way valve
19 Connection portion
20 Check valve
21 Three-way valve
22 Orifice opening and closing valve
24 Opening and closing valve
26 housing
31 Cooling water introduction pipe
32 Cooling water outlet pipe
33, 35 Refrigerant outlet pipe
34, 36 Refrigerant introduction pipe
40 Engine cooler
44 Heater core
48 Evaporator
52 expansion valve
56 Outside heat exchanger
60 Opening and closing valve
70 HVAC system
B Intake air path
F1, F2 Fan
110 Vehicle heat pump apparatus (Embodiment 2)
112 Electric compressor
114 Cooling water-to-refrigerant heat exchanger
116 Accumulator
118 Three-way valve
120 Check valve
122 Orifice opening and closing valve
124 Opening and closing valve
126 Housing
131 Cooling water introduction pipe
132 Cooling water outlet pipe
133 Refrigerant outlet pipe
134, 135 Refrigerant introduction pipe
140 Engine cooler
144 Heater core
148 Evaporator
152 Expansion valve
156 Outside heat exchanger
170 HVAC system
B100 Intake air path
F101, F102 Fan

The invention claimed is:

1. A vehicle air-conditioning apparatus comprising:
a compressor that compresses a suctioned refrigerant and discharges the compressed refrigerant;
an internal combustion engine cooler that causes cooling water to absorb heat from an internal combustion engine of a vehicle;
a heating heat exchanger that releases heat from high-temperature cooling water to air to be delivered to a vehicle interior;
an outside heat exchanger that allows the refrigerant to exchange heat with air outside the vehicle interior; and
a vehicle heat pump apparatus, wherein the vehicle heat pump apparatus comprises:
a housing of the vehicle heat pump apparatus;
a first refrigerant introduction section through which a high-temperature and high-pressure refrigerant discharged from the compressor is introduced from outside the housing;
a cooling water-to-refrigerant heat exchanger that is accommodated in the housing and that is capable of releasing heat from the high-temperature and high-pressure refrigerant introduced from the first refrigerant introduction section to a cooling water;
a cooling water introduction section that allows the cooling water to be introduced into the cooling water-to-refrigerant heat exchanger from outside the housing;
a cooling water outlet section that allows the cooling water to flow through outside the housing from the cooling water-to-refrigerant heat exchanger;
a first refrigerant outlet section that allows the refrigerant passing through the cooling water-to-refrigerant heat exchanger to flow through outside the housing; and
a cooling-water switching valve that is capable of switching between delivering the cooling water introduced from the cooling water introduction section to the cooling water outlet section via the cooling water-to-refrigerant exchanger, and delivering the cooling water to the cooling water outlet section without intervention of the cooling water-to-refrigerant heat exchanger,
the internal combustion engine cooler and the heating heat exchanger are connected to each other in series between the cooling water outlet section and the cooling water introduction section of the vehicle heat pump apparatus,
the outside heat exchanger is connected to the first refrigerant outlet section of the vehicle heat pump apparatus,
a discharge outlet of the compressor is connected to the first refrigerant introduction section of the vehicle heat pump apparatus, and
the cooling-water switching valve allows the cooling water to circulate through the internal combustion engine cooler and the heating heat exchanger by switching so as to deliver the cooling water from the cooling water introduction section to the cooling water outlet section without intervention of the cooling water-to-refrigerant heat exchanger, and allows the cooling water to circulate through the internal combustion engine cooler, the cooling water-to-refrigerant heat exchanger, and the heating heat exchanger by switching so as to deliver the cooling water from the cooling water introduction section to the cooling water outlet section via the cooling water-to-refrigerant exchanger.

2. The vehicle air-conditioning apparatus according to claim 1, wherein
the cooling water switching valve is accommodated in the housing.

3. The vehicle air-conditioning apparatus according to claim 1, further comprising an opening and closing valve having an expansion valve function, that is capable of switching between delivering the refrigerant passing through the cooling water-to-refrigerant heat exchanger to the first refrigerant outlet section while causing the refrigerant to expand and delivering the refrigerant while maintaining the refrigerant in a high pressure state.

4. The vehicle air-conditioning apparatus according to claim 1, further comprising:
a second refrigerant introduction section that introduces a low-pressure refrigerant from outside the housing;
an accumulator that separates the low-pressure refrigerant introduced from the second refrigerant introduction section into a gaseous refrigerant and a liquefied refrigerant; and
a second refrigerant outlet section that introduces the gaseous refrigerant separated by the accumulator into the compressor, wherein
the accumulator is accumulated in the housing.

5. The vehicle air-conditioning apparatus according to claim 4, further comprising an opening and closing valve between the second refrigerant introduction section and the accumulator.

6. The vehicle air-conditioning apparatus according to claim 5, wherein the opening and closing valve and the opening and closing valve having an expansion valve function are accommodated in the housing.

7. The vehicle air-conditioning apparatus according to claim 1 further comprising:

an evaporator that causes a low-temperature refrigerant to absorb heat from air to be delivered to the vehicle interior, wherein the outside heat exchanger and the evaporator are connected to each other in series between the first refrigerant outlet section of the vehicle heat pump apparatus and a suction inlet of the compressor, a refrigerant path connecting the evaporator and the suction inlet of the compressor is connected to the second refrigerant outlet section of the vehicle heat pump apparatus, and a refrigerant path between the outside heat exchanger and the evaporator branches out and is connected to the second refrigerant introduction section.

8. The vehicle air-conditioning apparatus according to claim 7, further comprising an expansion valve that allows a high pressure refrigerant to be delivered to the evaporator while causing the high pressure refrigerant to expand, wherein the expansion valve is disposed outside the vehicle heat pump apparatus and on an upstream side of the evaporator.

9. The vehicle air-conditioning apparatus according to claim 7, further comprising an opening and closing valve capable of opening and closing the refrigerant path between the outside heat exchanger and the evaporator.

* * * * *